United States Patent Office 3,318,783
Patented May 9, 1967

3,318,783
ANTITUMOR AGENT M-6672 AND METHOD OF PREPARATION
Alma W. Goldstein, Lake Bluff, Ill., assignor to Abbott Laboratories, North Chicago, Ill., a corporation of Illinois
No Drawing. Filed May 21, 1964, Ser. No. 369,321
6 Claims. (Cl. 195—80)

This invention relates to a new composition of matter possessing antitumor properties and to a process for its production. In particular, the invention is concerned with the substance herein designated M-6672 and with a method for its production.

Although the two organisms appear to be similar in a number of respects, the following table lists the significant differences and includes important characteristics which were not determined for *S. rameus*. Accordingly, the organism of the present invention is designated a new species and given the name *Streptomyces terminospiralis* indicating the spiral and coiled nature of the ends of its long spore chains. A living culture of *S. terminospiralis* has been deposited with the Northern Utilization Research and Development Division, Agricultural Research Service, U.S. Department of Agriculture, Peoria, Ill., and has the assigned number NRRL 3128.

DIFFERENTIAL CHARACTERISTICS OF *S. TERMINOSPIRALIS* AND *S. RAMEUS*

| Morphological | S. terminospiralis | S. rameus |
|---|---|---|
| Sporophores | Terminal coils, fists and spirals of three to five turns on long spore chains. | Incomplete spirals, loops or hooks. |
| Length of spore chain | Commonly 30–50 spores | Not reported. |
| Branching of sporophores | Monopodial, singly few pairs, and with terminal clusters. | Monopodial, (further information lacking). |
| Spore morphology | Predominantly bacillary or cylindrical with length to diameter ratio 3:1. | Oval to oblong. |
| Spore surface (Electron microscopy) | Smooth | Not reported. |
| Color: | | |
|    Sporulating aerial | White to yellow white | Grayish. |
|    Diffusible pigment Czapek's Agar | None | Yellow. |
| Physiologic: | | |
|    Melanin (tyrosine added to peptone-yeast extract iron agar). | Positive-heavy black pigment | Possibly positive, brown pigment on nutrient agar, potato and gelatin. |
|    $H_2S$ production (Lead acetate strip test) | Positive | Not reported. |
|    Haemolysis | do | Negative. |
|    Starch Hydrolysis | Very weak. 2 mm. 22 days by iodine test | Weak to moderate. 8.0 to 18.0 mm. |
| Proteolysis: | | |
|    Gelatin, Plain | 16 mm. 22 days | Not reported. |
|    Gelatin, Nutrient | do | Doubtful. |
|    Milk | No coagulation. Complete peptonization 14 days. | Weak coagulation. Doubtful peptonization. |
| Carbohydrate Utilization: | | |
|    Mannitol | Negative | Positive. |
|    Raffinose | do | Do. |
|    Salicin | Positive | Negative. |
|    Xylose | do | Do. |
|    Temperature limit | No growth at 50° C | Not reported. |
| Antagonistic Properties: | | |
|    Antibacterial Activity | Produces antibiotic similar to streptomycin by paper chromatography and antibacterial spectrum. | Produces streptomycin. |
|    Antitumor Activity | Positive | Not reported. |

The novel substance M-6672 is produced by cultivating on suitable nutrient media and under controlled conditions the hitherto undescribed microorganism *Streptomyces terminospiralis*. This organism was isolated from a pasture soil near Dallas, Texas, U.S.A. Its cultural, morphological, and physiological characteristics were compared with the published descriptions of known species and found to agree most closely with *Streptomyces rameus*, Okami et al., J. Antibiotics (Japan) 12A, 257–262, 1959. The name *S. galbus* used in this publication was also used by Frommer in describing a new species of Streptomyces, Arch. Mikrobiologie 32, 195, 1959. The name *Streptomyces rameus* is applied to the organism of Okami et al. in the Actinomycetes, Volume 2, Classification, Identification and Descriptions of Genera and Species, Selman A. Waksman, 1961, The Williams and Wilkins Company, Baltimore, Maryland.

*Taxonomy of* Streptomyces terminospiralis

Except as otherwise indicated, growth characteristics were determined after incubation at 28° C. on 100 mm. agar plates containing 20.0 ml. of the indicated media. Morphological characteristics by light microscopy were determined from both plates and micro slide cultures. Electron micrographs were obtained from agar plate growth. Determinations of color were made by comparison with the color chips of The Color Harmony Manual, third edition, Jacobsen, Granville and Foss, Container Corporation of America. Color names are those of the ISCC–NBS Method of Designating Colors and a Dictionary of Color Names, U.S. Department of Commerce, National Bureau of Standards, Circular 553, 1955.

Agar plates were inoculated in such a way as to provide a band of confluent growth about 1.0 cm. wide on one side of the plate with more or less isolated colonies over the remainder of the plate. Descriptions of isolated colonies were made from those usually not less than 1.0 cm. from the nearest growth.

DESCRIPTIVE CHARACTERISTICS OF STREPTOMYCES TERMINOSPIRALIS

| Medium | Day | Growth | Aerial | Reverse | Soluble pigment and other |
|---|---|---|---|---|---|
| Czapek's solution with dextrose agar. | 7 | Good. Colonies 2.5-3.0 mm. heaped, central pit, cracked. | Abundant, White. | Inner confluent 1½ ea, light yellow; outer confluent and isolated colonies, 1½ fb, mod. yellow. | None. |
| | 14 | Isolated colonies 4.5 mm. crateriform with radial folds, many with ruptured surface. | Abundant aerial. Abundant spores b white. | 2 ga, light yellow both of above areas. | Do. |
| | 22 | As day 14, 5.0 mm. with slight extension below agar surface. | As day 14. | Isolated colonies and edge of confluent 2 kb, strong yellow; Inner confluent 2 ga, light yellow. | Do. |
| Ca Malate Agar. | 7 | Moderate. Colonies 3.0 mm. with feathery edges. | Sparse. | | None. Moderate digestion of malate in crowded areas. |
| | 14 | Good. Isolated colonies flat 4.0 mm. with extension into agar. | Abundant aerial. Abundant white spores. | | None. Digestion 3.0 mm. from edge of confluent growth. |
| | 22 | Essentially same as day 14. | Spore color 2 ba, yellowish white. | Uniformly 2 db, pale yellow. | As day 14. Digestion 5.0 mm. |
| Glycerol Asparagine Agar. | 7 | Abundant. Colonies flat, 4.0 mm. with erose edges. | Sparse. | 1 db, pale yellow green. | None. |
| | 14 | 2.0 mm. zone of clearing of medium around each colony. Isolated colonies 6.0 mm. undulate edges. | Abundant aerial and spores b, white. | 1½ ea, light yellow. | Do. |
| | 22 | Colonies 8.0 mm. with 4.0 mm. low convex center, extension into agar 1.0 mm. | As day 14. | Center of confluent growth 2 ea, light yellow. Edge and colonies 2 hb, moderate yellow. | Do. |
| Inorganic salts soluble starch agar. | 7 | Light to moderate. Pinpoint colonies. | Very sparse. | | |
| | 14 | Moderate. Colonies 1.0 mm. with 1.0 mm. extension into agar. | Sparse aerial moderate sporulation. | 3 ga, light orange yellow. | None. No hydrolysis by iodine test. |
| | 22 | As day 14. | Moderate aerial and abundant spores 2 ba, yellowish white. | 2 gc, grayish yellow. | None. Hydrolysis only under growth. |
| Yeast extract, soluble starch, dextrose agar. | 7 | Good. Colonies 3.5-5 mm. heaped centers with numerous radial folds. | Sparse. | 2 fb, pale yellow. | None. Hydrolysis negative. |
| | 14 | Essentially same. | Sparse to moderate aerial and spores. | 2 hb, light to moderate yellow. | None. Test for hydrolysis omitted. |
| | 22 | Colonies 4.0 mm. convex with central papilla, entire edge. | Abundant aerial and spores 2 ba, yellowish white. | 2 ga, light yellow. | None. 2.0 mm. zone of hydrolysis beyond edge of confluent growth by iodine test. |
| Yeast-malt extract agar. | 7 | Abundant growth. Colonies 4-5 mm. heaped with central pit and radial folds, undulate edge. | Abundant aerial and spores, white. | 3 ne, strong yellowish brown. | Slight brownish. |
| | 14 | As above with colonies more crateriform. | b, white. | 2 mb, strong yellow. | None. |
| | 22 | Colonies 10.0 mm. with 1-2 mm. extending into agar. Annular rings present near flat outer edge of growth. | do. | | |
| Tomato Paste, oatmeal agar adjusted pH 7.0 with NaOH. No growth with pH unadjusted.[1] | 6 | Abundant growth. Colonies 4-5 mm. with 0.5 mm. flat edge. | Abundant aerial and spores. b, white. Aerial most prolific at edge of growth. | | |
| | 13 | Colonies 5-7 mm. with annular rings. | Same. | | |
| | 21 | Same with extension of growth into agar 1-2 mm. | do. | | |
| Nutrient Agar. | 7 | Fair to moderate. Rough colonies 2.5 mm. slightly erose edges. | Very scant. | 2 ic, moderate yellow. | Very slight brownish. |
| | 14 | Colonies, irregular rough surface, flat 2-3 mm. | Very sparse. | 2 ic, strong yellow. | Very faint yellowish. |
| | 22 | Moderate. | Sparse aerial. | do. | |
| Nutrient Gelatin (Tubes) 24° C. | 7 | Abundant. | Abundant white aerial. | | Brownish black pigment. Liquefaction 7.0 mm. |
| | 14 | Growth sunk below surface to bottom of liquid portion. | | | Black pigment 10 mm. liquid. |
| | 22 | Same. | | | |
| Plain 12% Gelatin. | | Duplicated nutrient gelatin. | | | 16 mm. liquid same as nutrient gelatin. |

NOTE.—Two other streptomyces classified concurrently grew well on the unadjusted medium.

PHYSIOLOGICAL CHARACTERISTICS OF *STREPTOMYCES TERMINOSPIRALIS*

| | |
|---|---|
| Starch hydrolysis | very weak. |
| Haemolysis (human blood) | positive. |
| Proteolytic activity: | |
|    Gelatin (plain and nutrient) | moderate to good. |
|    Milk | Peptonized without coagulation 14 days. Final pH 8.2. |
|    Loeffler's serum — excellent growth | negative 22 days. |
| $NO_2$ from $NO_3$ (nutrient and synthetic) | negative (confirmed $Zn^{++}$). |
| Melanin production: | |
|    Peptone-yeast-iron agar | positive. |
|    Same plus 1.0% L-tyrosine | positive (more intense pigment). |
| $H_2S$ — From peptone-yeast-iron agar with filter paper strip containing lead acetate | positive. |

CARBOHYDRATE UTILIZATION BY *STREPTOMYCES TERMINOSPIRALIS*

| | | | |
|---|---|---|---|
| Xylose | + | Soluble starch | + |
| Arabinose | + | Salicin | + |
| Rhamnose | − | Glycerol | + |
| Dextrose | + | Mannitol | − |
| Galactose | + | Dulcitol | − |
| Mannose | + | Inositol | + |
| Fructose | + | Sorbitol | − |
| Sorbose | − | Na citrate | − |
| Sucrose | + | Na acetate | − |
| Lactose | − | Na-K tartrate | − |
| Maltose | + | Control (no carbon source) | − |
| Cellobiose | + | | |
| Raffinose | − | | |

[1] Basal medium of Pridham and Gottlieb, J. Bact. 56: 107, 1948. Determinations also made omitting $CuSO_4 \cdot 5H_2O$. Growth was more rapid and abundant in all cases of utilization with the modified medium.

*Micromorphology of* Streptomyces terminospiralis

Microscopic examinations were made at intervals during growth of the organisms on a number of media including those of carbon utilization studies. In addition, slide cultures made with yeast extract malt extract agar were examined. The media were in general agreement in production of monopodially branching sporophores from medium length aerial hyphae. Sporophores near the distal end of the hyphae arose closer together with some rebranching from secondary hyphae producing a clustered appearance. Sporophores sometimes occurred in pairs but verticils were absent. The sport chains were generally long containing up to as many as fifty spores and typically thirty or more. Some fully sporulated flexuous chains were seen as well as a few simple hooks and loops, but the majority produced fists, closed spirals and coils of three to five turns terminally.

Individual spores in a chain observed in slide cultures as well as on plate cultures were typically bacillary (cylindrical with rounded ends) with a smaller proportion of oval spores. Measurements were not taken but the length to diameter ratio approximated 3:1.

Electron micrographs confirmed the bacillary morphology and showed the spore surface to be of the smooth type.

Fermentation of *Streptomyces terminospiralis* NRRL 3128 is carried out in submerged form in an aqueous nutrient medium containing suitable sources of carbon and nitrogen and with appropriate agitation, aeration and temperature control. A temperature of 24°–28° C. is suitable for production of the antitumor agent in a period of 2–4 days. We prefer a 3 day fermentation at 24° C. The presence of the antitumor agent in the fermentation broth can be demonstrated by daily intraperitoneal injections of an appropriate dilution of the filtered broth into mice bearing the experimentally induced tumor Sarcoma 180 or Carcinoma 755. No microorganism has been found which is sensitive to antitumor agent M–6672 in concentrations suitable for assay. Since the animal test consumes at least 7 days, it is desirable to proceed with the isolation without waiting for the assay. If desired, however, the fermented broth can be stored for several weeks at temperatures of 0°–5° C.

The antitumor agent is isolated from the fermented broth by fractional precipitation with solvents. Antitumor agent M–6672 is virtually insoluble in such water miscible solvents as methanol and acetone and is very soluble in water. By evaporating most of the water from the filtered broth at reduced pressure, adding the solvent in portions and removing the precipitate after each addition of solvent, a series of precipitates is obtained which are shown by the standard Sarcoma 180 mouse test to contain the desired antitumor substance.

Antitumor agent M–6672 is a light brown powder very soluble in water, soluble in 90% aqueous alcohol (methyl or ethyl) and insoluble in dry alcohols, acetone and other common organic solvents. It exhibits no optical rotation at the wave length of the sodium D-line and no characteristic absorption of ultraviolet light.

The following examples illustrate the formation, recovery and concentration of antitumor agent M–6672.

EXAMPLE 1.—FERMENTATION IN SHAKEN FLASK

*Streptomyces terminospiralis* was seeded from soil stock to an agar slant of the following composition and incubated for about five days at 28° C.

| | | |
|---|---|---|
| Glucose | g | 4 |
| Yeast extract | g | 4 |
| Malt extract | g | 10 |
| Agar | g | 20 |
| $H_2O$ | liter | 1 |

After incubation, the resulting growth was scraped from the agar slant and introduced into 150 ml. of sterile medium of the following composition in a 500 ml. Erlenmeyer flask:

| | | |
|---|---|---|
| Soybean meal | g | 15 |
| Glucose | g | 15 |
| NaCl | g | 5 |
| $CaCO_3$ | g | 1 |
| $H_2O$ | liter | 1 |

This flask was incubated for 48 hours at 28° C. on a rotary shaker describing a 2¼ inch eccentric at about 240 r.p.m. Following this, another flask containing sterile medium of the same composition was seeded with about 4% v./v. of the resultant growth from the first flask. This flask was also incubated for 48 hours at 28° C. with shaking.

For production, a 500 ml. Erlenmeyer flask containing 150 ml. of sterilized medium of the following composition was seeded with 4% v./v. of material from the second 48 hour flask. Incubation and agitation for this flask was as before with the exception that the incubation period was for approximately 72 hours.

| | | |
|---|---|---|
| Soybeam meal | g | 15 |
| Glucose | g | 15 |
| NaCl | g | 5 |
| $CaCO_3$ | g | 1 |
| Glycerol | g | 2.5 |
| Distillers dried solubles | g | 5 |
| $H_2O$ | liter | 1 |

After incubation, the resultant material was harvested and the filtrate tested for activity against Sarcoma 180 in mice with the following results:

| Test No. | Dilution for Dosage | Tumor Change | Percent Reduction |
|---|---|---|---|
| 1 | Undiluted | [1] .25/1.45 | 83 |
| 2 | do | [1] .25/.98 | 75 |
| 3 | do | [2] 0/8670 | 100 |

[1] Test tumor diameter in centimeters/control tumor diameter in centimeters.
[2] Test tumor weight in milligrams/control tumor weight in milligrams.

EXAMPLE 2.—PRODUCTION IN SMALL FERMENTORS

In each of 4 stainless steel fermentation tanks of 23 liters capacity is placed 12 liters of an aqueous nutrient medium having the following composition.

| | Per liter |
|---|---|
| Glucose | g 25 |
| Soybean Meal | g 20 |
| Corn Steep Liquor | g 5 |
| NaCl | g 5 |
| $CaCO_3$ | g 1 |
| Polypropylene Glycol | ml 1 |

The pH is adjusted to 6.8 by addition of sodium carbonate and the tanks and their contents are sterilized by autoclaving at 121° C. for 60 minutes. After cooling, each tank is inoculated with 300 ml. of second passage seed culture prepared as in Example 1. The tanks and their contents are maintained at a temperature of 24° C. for 3 days during which time the contents are mechanically stirred and sterile air is forced into the bottom of each tank at a rate of 12 liters per minute.

At the end of the fermentation, the broth is filtered and concentrated by vacuum distillation to 2150 ml. and diluted with 12.9 liters of methanol. A precipitate is formed consisting of about half the solids originally present in the filtered broth. The precipitate is removed by filtration and discarded. To the filtrate is added 5 liters of acetone and the precipitate which forms at this point is recovered by filtration, dissolved in water and freeze-dried to yield the crude antitumor agent as a powder. Additional active precipitate is formed when another 5 liters of acetone is added to the filtrate. The solids remaining in solution after the second precipitation are inactive.

What I claim is:
1. A process for the production of M–6672 which comprises cultivating the organism *Streptomyces terminospiralis* under submerged aerobic conditions in an aqueous culture medium containing assimilable sources of carbohydrates, organic nitrogen and inorganic salts until substantial antitumor activity is produced by said organism and fractionally precipitating with a water-miscible solvent M–6672 from said culture medium.
2. A process as claimed in claim 1 in which the organism employed is *Streptomyces terminospiralis* NRRL 3128.
3. A process as claimed in claim 2 in which the culture medium is maintained at a temperature of from 24°–28° C. for a period of from 2 to 4 days.
4. A process as claimed in claim 2 which includes the steps of filtering and concentrating the culture medium and adding a water miscible solvent selected from the group consisting of methanol and acetone to fractionally precipitate the M–6672.
5. A process as claimed in claim 4 in which the water miscible solvent employed is methanol.
6. The product M–6672 produced by the process of claim 1.

No references cited.

A. LOUIS MONACELL, *Primary Examiner.*

A. E. TANENHOLTZ, *Assistant Examiner.*